Patented June 24, 1930

1,767,423

UNITED STATES PATENT OFFICE

ROGER ADAMS, OF URBANA, ILLINOIS, ASSIGNOR TO ABBOTT LABORATORIES, OF NORTH CHICAGO, ILLINOIS, A CORPORATION OF ILLINOIS

ARYLAMINOALCOHOL COMPOUND

No Drawing.    Application filed January 27, 1928. Serial No. 250,076.

My invention relates to the preparation of compounds of the general formula

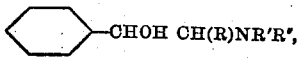

where R represents an alkyl group, R' represents an aliphatic hydrocarbon radical such as an alkyl, and R'' represents hydrogen or an aliphatic hydrocarbon radical containing more than one carbon atom.

These compounds are of therapeutic value. They cause a rise in blood pressure and exert a so-called sympathomimetic effect.

These amines may be produced by several series of reactions, and the following equations will illustrate one of the possible methods which may be employed for their synthesis:

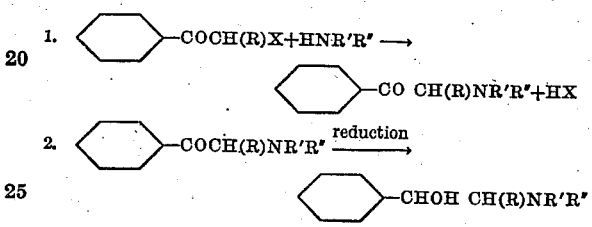

where X represents a halogen, and R, R', and R'' represent the atoms or radicals already indicated. These reactions may be carried on as follows:—

A solution containing 2.5 molecular equivalents of the desired amine, HNR'R'', is placed in a flask equipped with a thermometer, stirrer, and means for temperature control. The amine solution is preferably of about 30% strength, and the solvent may be water or an organic liquid, such as alcohol. To this solution, cooled to about −5° C., is slowly added one molecular equivalent of the compound

keeping the temperature below 5° C. Stirring is continued at this temperature for an hour or more, ice is then added, and the solution neutralized with hydrochloric acid until just acid to litmus. The unchanged halogen compound

is extracted with ether. The solution left after the ether extraction is neutralized with cold dilute sodium hydroxide solution, the base

extracted with an immiscible solvent like ether or benzene, the extract dried, and the solvent removed. Ice is then added, and the base is neutralized with hydrochloric acid, and the solution evaporated practically to dryness. The residue is taken up in alcohol, decolorized by carbon black, acetone added, and the crystalline material removed by filtration. It may be further purified by redissolving in alcohol or chloroform, followed by the addition of acetone. The ketone hydrochlorides,

so obtained are white crystalline solids, readily soluble in water.

The above ketones may be reduced by several methods; my preferred method is to reduce catalytically by means of platinum oxide, according to the method of Adams and Shriner (Journal of the American Chemical Society, 45, 2171 (1923). For example, the required amount of platinum oxide is placed in a stout glass bottle, covered with alcohol and reduced by hydrogen. By means of 0.5 gram of catalyst so prepared, 30 grams of the above ketone hydrochloride, dissolved in the least feasible quantity of absolute alcohol, is reduced in the bottle by hydrogen at 30 to 40 pounds pressure. The reduction is ordinarily practically complete in one-half hour. The platinum oxides are removed by filtration, the alcohol solution concentrated, and the reduced amino compound, having the general formula

is allowed to crystallize. It is recrystallized from alcohol. The compounds so obtained are white crystalline solids, having rather high melting points, and being readily soluble in water, less so in organic solvents.

By this general method there have been prepared the following compounds. In the table, the symbols R, R', and R'' signify groups as already defined. All temperatures are given in degrees Centigrade.

| R is— | R' is— | R" is— | Melting point of intermediate $C_6H_5COCH(R)NR'R''.HCl$ | Melting point of $C_6H_5CHOHCH(R)NR'R''.HCl$ |
|---|---|---|---|---|
| Methyl | Ethyl | Hydrogen | 183°–184° | 190°–191° |
| Methyl | Ethyl | Ethyl | 167°–168° | 205°–206° |
| Methyl | n-Propyl | Hydrogen | 180° | 218° |
| Methyl | Iso-Propyl | Hydrogen | 213°–213.5° | 193° |
| Methyl | n-Butyl | Hydrogen | 158°–159° | 220°–221° |
| Methyl | n-Amyl | Hydrogen | 150° | 219° |
| Ethyl | Methyl | Hydrogen | 190°–192° | 197°–199° |
| n-Propyl | Methyl | Hydrogen | 182°–184° | 224°–225° |

The scope of the invention should be determined by reference to the appended claims, said claims being construed as broadly as possible consistent with the state of the art.

I claim as my invention:

1. As a new article of manufacture, a compound of the general formula

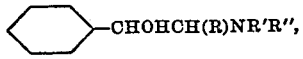—CHOHCH(R)NR'R", where R represents an alkyl group, R' represents a monovalent saturated aliphatic hydrocarbon radical, and R" represents a hydrogen or a monovalent saturated aliphatic hydrocarbon radical containing more than one carbon atom, and the R, R', and R" substituents together contain not less than 3 carbon atoms.

2. As a new article of manufacture, a compound of the general formula

—CHOHCH(R)NR'H, where R represents an alkyl group, and R' represents a monovalent saturated aliphatic hydrocarbon radical, where the R and R' substituents together contain not less than 3 carbon atoms.

Jan. 24, 1928.

ROGER ADAMS.